Oct. 19, 1965   D. N. SUMMERFIELD   3,213,307
COMMUTATOR CONNECTIONS SUPPORT CONSTRUCTION
Filed Sept. 13, 1962
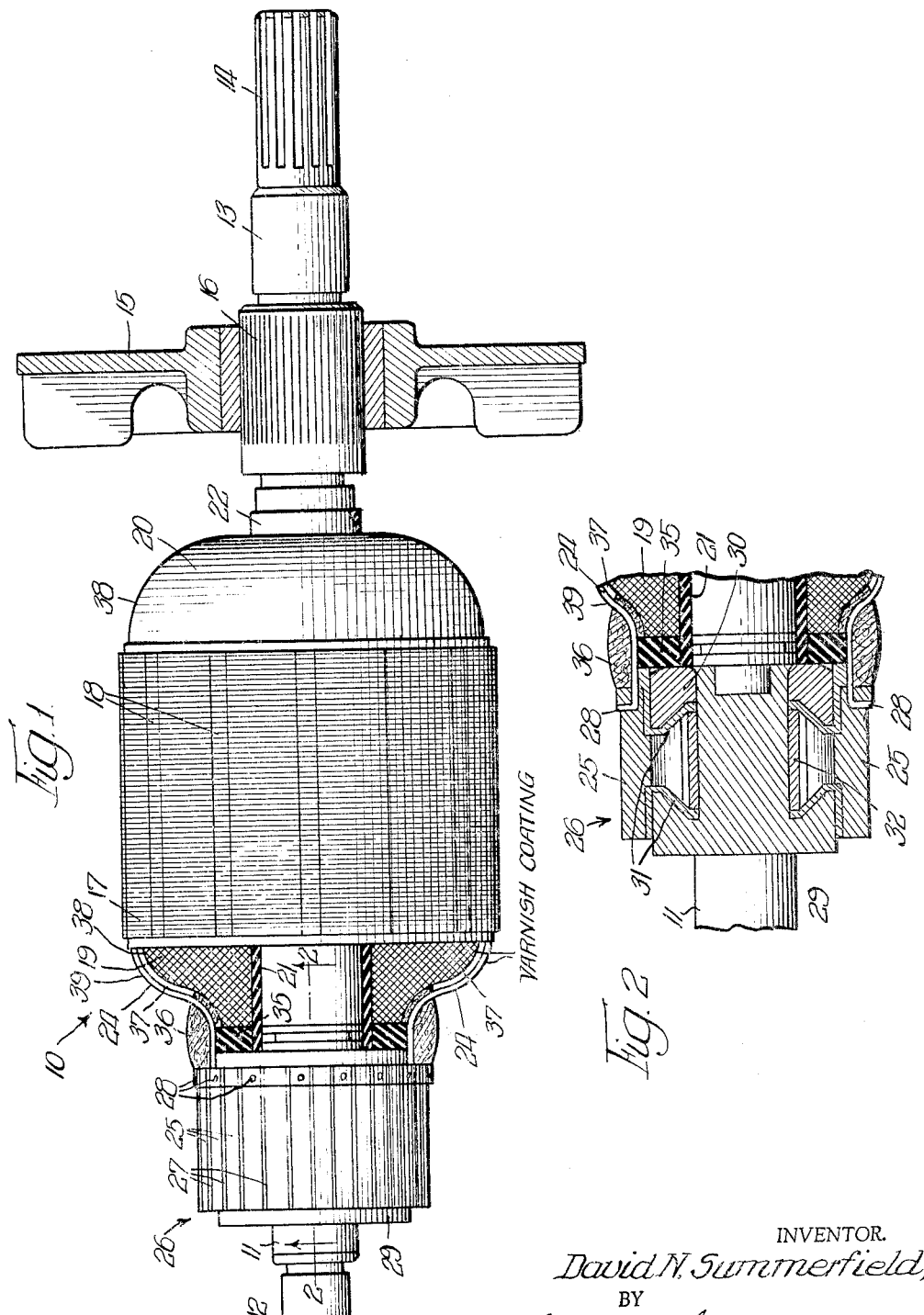
INVENTOR.
David N. Summerfield,
BY
Cromwell, Greist & Warden
Attys United States Patent Office 3,213,307
Patented Oct. 19, 1965

3,213,307
COMMUTATOR CONNECTIONS SUPPORT
CONSTRUCTION
David N. Summerfield, Glen Ellyn, Ill., assignor to Skil Corporation, Chicago, Ill., a corporation of Delaware
Filed Sept. 13, 1962, Ser. No. 223,379
6 Claims. (Cl. 310—234)

This invention relates, generally, to dynamo-electric devices and it has particular relation to the construction of armatures therefor.

Experience indicates that armatures which are subjected to severe vibration, particularly to impact loads, are vulnerable to premature failure as a result of the breakage of the lead wires interconnecting the armature winding and the commutator bars. The breakage usually takes place at those portions of the lead wires immediately adjacent the commutator bars to which they are connected. This causes an open circuited armature winding which results in loss in power and may result in inability to rotate at all. Tests on armatures arranged to drive impact loads show that there is a slight relative angular movement between the commutator and the slotted stack of laminations in which the armature winding is located. Such relative angular movement is caused by the pulsating torque that is applied to the shaft because of the nature of the load. As a result of the pulsations in the load both torsional and radial loads are applied to the armature shaft and are transmitted therethrough to the commutator which responds by oscillating relative to the shaft and to the stack of laminations carrying the armature winding through a relatively small angle in the fashion of a torsion pendulum. It is because of the slight relative movement between the commutator and the armature winding that the lead wires interconnecting them are likely to become broken adjacent the commutator bars to which the lead wires are connected.

By way of illustrating a specific instance in which armatures are subjected to severe vibration and impact loads reference is made to electrically powered tools such as the rotary hammer shown in Patent No. 3,022,769 to Amundsen et al. dated February 27, 1962. The armature of the electric motor for the tool shown in Patent No. 3,022,769 is indicated at 70 in FIG. 1 of co-pending application Serial No. 19,784 of James McCloud filed April 4, 1960, entitled, Pneumatic System for a Rotary Hammer Device, now U.S. Patent 3,114,421.

Accordingly, among the objects of this invention are: To construct an armature for a dynamo-electric device in such manner as to avoid breakage of the lead wires for either direction of rotation of the armature; to fill the space between the end turns of the armature winding and the commutator with elastic material which allows the armature winding to oscillate with respect to the commutator without developing stresses in the lead wires which would damage them and which would damage the varnished end turns between the commutator and the slotted stack of laminations carrying the armature winding which would ultimately lead to failure of the armature by breakage of the lead wires; and to provide freedom for the lead wires to move through a small angle due to oscillation of the commutator with respect to the armature winding while restraining the lead wires from undamped oscillations which would tend to increase in magnitude until lead breakage would occur.

In the drawing:

FIG. 1 is a view, on approximately double scale, partly in side elevation and partly in section, showing an armature construction embodying the present invention similar to the armature shown in FIG. 1 of said co-pending application Serial No. 19,784; and FIG. 2 is a vertical cross-sectional view showing certain details of construction of the commutator and associated resilient mounting for the lead wires interconnecting the commutator bars and the armature winding.

Referring now particularly to FIG. 1 of the drawing, it will be observed that the reference character 10 designates, generally, an armature for a dynamo-electric device which includes a shaft 11 that is provided with journals 12 and 13 for mounting in bearings in a suitable stator provided with poles that are arranged to be suitably energized. Since the present invention is directed particularly to the construction of the armature 10 and since the armature can be used with any stator of conventional construction, only the details of construction of the armature 10 are shown herein. Any suitable means can be employed for transmitting the torque of the shaft 11 to a load. For example a worm 14 can be formed at one end for engagement with a suitable worm gear to drive the load. A fan 15 non-rotatably mounted on a knurled section 16 of the shaft 11 provides for ventilation of the device in conventional manner.

Non-rotatably mounted on the shaft 11 intermediate its ends is a stack 17 of laminations of the kind and character that are employed for the construction of dynamo-electric devices. Slots 18 are provided in equal spaced relation around the stack 17 for receiving an armature winding therein of which only the end turns 19 and 20 are visible. They extend over insulating sleeves 21 and 22 that are telescoped with the underlying portions of the shaft 11.

Lead wires 24 serve to interconnect the armature winding with commutator bars 25 of commutator that is indicated, generally, at 26 and is non-rotatably mounted on the shaft 11. The arrangement of armature windings and the connection between the windings and the lead wires are of known design. For example, the armature windings and connection between the latter and the lead wires may be of the type shown in U.S. Patent 2,831,991 to Kenneth Perkins. The commutator bars 25 are located in insulated spaced relation with insulation 27 being provided therebetween in conventional manner. The ends of the lead wires, two per commutator bar 25, are fusion staked thereto as indicated at 28. Other means can be employed for interconnecting the lead wires 24 and commutator bars 25.

The construction of the commutator 26 is conventional. The commutator bars 25 are mounted on a V-support 29 that is non-rotatably secured to the shaft 11. A V-ring 30 cooperates with the V-support 29 to clamp the commutator bars 25 therebetween. V-insulating bushings 31—31 and an insulating sleeve 32 serve to insulate the commutator bars 25 from the adjacent metallic supports.

As pointed out hereinbefore, when the armature 10 is used to drive impact loads or similar loads, there is the tendency for the commutator 26 to oscillate slightly with respect to the stack 17 of laminations and the armature winding mounted thereon. This often results in breakage of the lead wires 24 at locations immediately adjacent the commutator bars 25 where the lead wires 24 are connected.

In accordance with this invention provision is made for resiliently mounting the lead wires 24 at the location of possible breakage in order to prevent such damage and to damp oscillations that are set up when the lead wires 24 are not so supported. For this purpose an elastic insulating washer 35 is interposed between the end turns 19 and the commutator 26. As shown in the drawings the elastic insulating washer 35 completely fills the space between the end turns 19 and the commutator 26 and overlies the insulating sleeve 21. Preferably the elastic insulating washer 35 is formed of silicone rubber or other resilient rubber-like material capable of withstanding varnishing and the environmental or operating temperatures. It is non-porous and is impermeable to varnish. Other resilient, rubber-like compositions having similar characteristics can also be employed. It will be understood that the elastic insulating washer 35 is placed in position during the assembly of the armature 10 and before the lead wires 24 are connected to the commutator bars 25.

After the ends of the lead wires 24 have been connected to the commutator bars 25, two leads per bar, an annular filling 36 of elastic insulating material is applied, in paste-like condition, in overlying relation to the elastic insulating washer 35 and along the ends of the commutator bars 25 facing the end turns 19 of the armature winding. The filling 36 embeds those portions of the lead wires 24 immediately adjacent the commutator bars 25 and extends somewhat into a space 37 that exists between the lead wires 24 and the end turns 19 which is formed by arranging the lead wires 24 so as to have a definite amount of slack.

The filling 36 of resilient, rubber-like, adhesive and sealant material is desirably a silicone rubber composition which can be applied or flowed-in through a nozzle connected with a supply under pressure. It retains its resiliency in use and will readily withstand environmental operating temperatures and varnishing temperatures. Suitable silicone rubber compositions are available in paste-like form which are self-curing at room temperatures. Silastic RTV731, a general purpose silicone rubber adhesive and sealant of Dow Corning Corporation, Midland, Michigan, is one commercially available product that may be used. It will be understood that other silicone rubber compositions and other plastics having similar properties may also be used.

After the filling 36 of elastic insulating material has been applied with the lead wires 24 spaced as indicated at 37 from the end turns 19, varnish is applied as indicated at 38 to the end turns 19 and also to the end turns 20. At the same time varnish is applied as indicated at 39 to the lead wires 24. However, since they are spaced, as indicated at 37, from the end turns 19, the spacing is maintained after the varnish sets with the result that the lead wires 24 are free to move with respect to the end turns 19 except as they are restrained at their ends which are connected to the armature winding and the other ends which extend over the elastic insulating washer 35 and are embedded in the annular filling 36 of elastic insulating material. Because of the presence of the filling 36 of elastic insulating material, the portions of the lead wires 24 embedded therein are maintained free of varnish.

Since the elastic insulating washer 35 and the annular filling 36 of elastic insulating material are non-porous and impermeable to varnish, they are not impregnated thereby and rendered rigid. Rather, they permanently retain their resilient characteristics. The exclusion of the relatively rigid varnish from the space immediately adjacent the commutator 26 and the presence of the resilient mounting provided by the washer 35 and filling 36 for the lead wires 24 provides a non-rigid connection between the end turns 19 and the commutator 25 with the result that the commutator 25 is permitted to oscillate with respect to the end turns 19 without developing stresses which might affect the end turns 19 since they are encased in the insulating varnish 38 and thus form a relatively rigid structure. The construction as described with the lead wires 24 embedded in elastic material permits them to flex slightly as the commutator 26 oscillates about the shaft 11 as the result of its being connected to an impact type of load. The oscillations thus set up in the lead wires 24 are dampened and they are prevented from vibrating unrestrainedly and setting up stresses which would likely lead to breakage of the lead wires 24.

It will be understood that certain changes may be made in the specific embodiment disclosed without departing from the spirit and scope of this invention.

What is claimed as new is:

1. In an armature for a dynamo-electric device having a shaft, a commutator on said shaft formed by a plurality of commutator bars in insulated spaced relation, a stack of slotted laminations on said shaft in spaced relation to said commutator, and an armature winding in the slots of said stack of laminations having end turns at one end between said commutator and said stack, the improvement comprising, an inner elastic insulating washer interposed between said commutator and said end turns, lead wires from said commutator bars to said armature winding in overlying relation to said end turns and said elastic washer, and an outer annular filling of softly elastic insulating material juxtaposed to the end of said commutator facing said end turns in overlying relation to said elastic insulating washer and embedding said lead wires.

2. The invention, as set forth in claim 1, wherein the lead wires extend in slack relation over the end turns.

3. The invention, as set forth in claim 2, wherein insulating varnish overlies the lead wires and end turns with the former being out of contact with the latter for a substantial portion of the length of said lead wires.

4. The invention, as set forth in claim 1, wherein the elastic insulating washer is formed of resilient rubber-like material capable of withstanding the environmental temperatures and impervious to varnish.

5. The invention, as set forth in claim 1, wherein the annular filling of elastic insulating material is a composition of rubber-like material capable of retaining its softly elastic characteristic in use and capable of withstanding varnishing.

6. In an armature for a dynamo-electric device having a shaft, a commutator on said shaft formed by a plurality of commutator bars in insulated spaced relation, a stack of slotted laminations on said shaft in spaced relation to said commutator, and an armature winding in the slots of said stack of laminations having end turns at one end between said commutator and said stack, the improvement comprising, lead wires extending in slack relation from said end turns and connected to said commutator bars, an annular insulating formation of softly elastic material embedding the ends of said lead wires adjacent said commutator bars thereby resiliently mounting the lead wires so as to dampen oscillations set up in the latter.

References Cited by the Examiner

UNITED STATES PATENTS

| | | | |
|---|---|---|---|
| 1,382,821 | 6/21 | Coates | 310—80 |
| 1,672,221 | 6/28 | Karceosk | 310—80 |
| 1,991,057 | 2/35 | McCloskey | 310—234 |
| 2,381,583 | 8/45 | Forss | 310—34 X |
| 2,581,445 | 1/52 | Riley et al. | 310—234 |
| 2,831,991 | 4/58 | Perkins | 310—234 |
| 2,897,385 | 7/59 | Powell | 310—234 |
| 3,129,349 | 4/64 | Ervin | 310—234 |

OTHER REFERENCES

Rosenberg, R.: "Electric Motor Repair," page 130; published by Murray Hill Books, Inc., New York, 1946.

MILTON O. HIRSHFIELD, *Primary Examiner.*

UNITED STATES PATENT OFFICE
CERTIFICATE OF CORRECTION

Patent No. 3,213,307                      October 19, 1965

David N. Summerfield

It is hereby certified that error appears in the above numbered patent requiring correction and that the said Letters Patent should read as corrected below.

Column 4, line 58, for "2,381,583" read -- 2,381,533 --.

Signed and sealed this 10th day of May 1966.

(SEAL)
Attest:

ERNEST W. SWIDER                      EDWARD J. BRENNE
Attesting Officer                      Commissioner of Patents